(12) United States Patent
Okawa

(10) Patent No.: US 11,584,092 B2
(45) Date of Patent: Feb. 21, 2023

(54) METHOD FOR PRODUCING THREE-DIMENSIONAL OBJECT AND FORMING APPARATUS

(71) Applicant: MIMAKI ENGINEERING CO., LTD., Nagano (JP)

(72) Inventor: Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/564,351

(22) PCT Filed: May 25, 2016

(86) PCT No.: PCT/JP2016/065416
§ 371 (c)(1),
(2) Date: Oct. 4, 2017

(87) PCT Pub. No.: WO2016/190342
PCT Pub. Date: Dec. 1, 2016

(65) Prior Publication Data
US 2018/0126664 A1 May 10, 2018

(30) Foreign Application Priority Data
May 25, 2015 (JP) .............................. JP2015-105462

(51) Int. Cl.
*B29C 67/00* (2017.01)
*B33Y 10/00* (2015.01)
(Continued)

(52) U.S. Cl.
CPC ........ *B29C 67/0007* (2013.01); *B29C 64/106* (2017.08); *B29C 64/112* (2017.08);
(Continued)

(58) Field of Classification Search
CPC ... B29C 64/106; B29C 64/112; B29C 64/386; B29C 67/0007; B29C 67/00;
(Continued)

(56) References Cited

U.S. PATENT DOCUMENTS 6,129,872 A * 10/2000 Jang ........................ B29C 41/36
264/75
6,799,959 B1 * 10/2004 Tochimoto ............ B29C 64/165
425/130

(Continued)

OTHER PUBLICATIONS

Oxford, Ink, retrieved Dec. 17, 2020 (Year: 2020).*

*Primary Examiner* — Francisco W Tschen
*Assistant Examiner* — Elisa H Vera
(74) *Attorney, Agent, or Firm* — Rankin, Hill & Clark LLP

(57) ABSTRACT

Such internal decoration is implemented that an object looks a target color as viewed in any direction, and that the object is colored and has image depiction in any cross-section. A method is provided for producing a three-dimensional object by extruding a build material to form a layer corresponding to each of cross-sections obtained by slicing a target object by a plurality of parallel planes, and depositing such layers in sequence so as to form the three-dimensional object. A white material 15 and one or two or more decoration materials 13 of colors other than white, which solidify wider a predetermined condition after extruded from nozzles, are used as the build material. The decoration materials 13 and the white material 15 are mixed to form the layer.

11 Claims, 9 Drawing Sheets

(51) Int. Cl.
  *B29C 64/106* (2017.01)
  *B29C 64/112* (2017.01)
  *B29C 64/386* (2017.01)
  *B33Y 50/02* (2015.01)
  *B33Y 30/00* (2015.01)

(52) U.S. Cl.
  CPC ............ *B29C 64/386* (2017.08); *B29C 67/00* (2013.01); *B33Y 10/00* (2014.12); *B33Y 30/00* (2014.12); *B29K 2995/002* (2013.01); *B29K 2995/0012* (2013.01); *B29K 2995/0021* (2013.01); *B29K 2995/0026* (2013.01); *B33Y 50/02* (2014.12)

(58) Field of Classification Search
  CPC .... B29K 2995/0021; B29K 2995/0012; B29K 2995/002; B29K 2995/0026; B33Y 10/00; B33Y 30/00; B33Y 50/02
  See application file for complete search history.

(56) References Cited

U.S. PATENT DOCUMENTS

| | | | | |
|---|---|---|---|---|
| 2002/0167101 | A1* | 11/2002 | Tochimoto | B29C 41/36 264/40.1 |
| 2014/0277661 | A1* | 9/2014 | Amadio | G05B 19/4099 700/97 |
| 2015/0185375 | A1* | 7/2015 | Hannington | B29C 70/64 156/60 |
| 2016/0151980 | A1* | 6/2016 | Hatanaka | G05B 19/4099 700/98 |
| 2016/0229124 | A1* | 8/2016 | Yoshikawa | B29C 64/386 |
| 2016/0250807 | A1* | 9/2016 | Atwood | B33Y 30/00 264/401 |
| 2016/0339643 | A1* | 11/2016 | Dikovsky | B29C 64/112 |
| 2017/0087765 | A1* | 3/2017 | Rundlett | G03F 7/16 |
| 2017/0246812 | A1* | 8/2017 | Morovic | B29C 64/386 |

* cited by examiner (A)

(B)

Per layer: 100% White+50% Color
30 layers in total: 3000% White+1500% Color

Per layer: 100% +5% Color
30 layers in total: 3000% White+150% Color

METHOD FOR PRODUCING THREE-DIMENSIONAL OBJECT AND FORMING APPARATUS

TECHNICAL FIELD

The present invention relates to methods for producing a three-dimensional object formed in a colored state by an ink-jet printer, and forming apparatuses. More particularly, the present invention relates to a method for producing an internal-decoration three-dimensional object, for example, which is decorated not only on the surface but also inside (cross-sections), and a forming apparatus.

BACKGROUND ART

Conventionally, it has been known to slice a three-dimensional target object into cross-sections by a plurality of parallel planes and deposit layers of resin corresponding to the respective cross-sections in sequence to perform three-dimensional formation to produce an object as a three-dimensional model of the target object. In a case of coloring such a three-dimensional object, build resin colored in advance is to be used.

In another case of coloring a three-dimensional object, it has been suggested to extrude coloring material into a surface layer of the three-dimensional object and extrude build resin into an inner region to form a layer corresponding to each of cross-sections into which a target object is sliced by a plurality of parallel planes, and deposit such layers in sequence to produce the three-dimensional object equivalent to the target object having the surface colored (patent document I). For this three-dimensional object, (W) resin is used to express bright colors, and shading and gradation of colors that cannot be expressed with only three colors Y M, and C. In some cases, the white resin is extruded along with the three colors Y, M, and C into only a surface layer of the three-dimensional object as necessary based on coloring information derived from the target object. In a case where the white resin is used as build resin, however, the white resin serves as paper (substrate) in normal 2D printing. Consequently, the white (W) resin is not used for coloring a surface layer, but only the three colors Y, M, and C are used for coloring the surface layer. In such cases, coloring material is extruded into only the surface layer of the three-dimensional object except for a case in which it involves control difficulty to strictly color the surface alone.

RELATED ART DOCUMENTS

Patent Documents

Patent document 1: Japanese Unexamined Patent Application Publication No. 2000-280357.

DISCLOSURE OF THE INVENTION

Problems to be Solved by the Invention

The conventional three-dimensional object, however, which is formed of a single resin material prepared to have a desired color in advance, is in a single-colored state, Therefore, although the object is decorated in the same color wherever it is sliced, the object has only the same color in any area. That is, since the object is in the single-colored state, it is impossible to decorate the object in full color and provide the object with color shading, gradation, and other features. A method for formation using materials (such as inks) of a plurality of colors to express a second color and a third color has been also known. In such a case, however, the number of colors expressible is normally limited. Consequently, when a three-dimensional object requires coloring in a plurality of colors and coloring that includes changes by shading of color, the designer needs to draw patterns on and color the object in the following steps. This disadvantageously takes time and cost more than necessary.

Moreover, because of the single-colored or limitedly colored state, it is possible to change color on a part-by-part basis, but a configuration or other factors of the apparatus cause difficulty in forming the single three-dimensional object with partial color differences and gradation. Besides, after forming the three-dimensional object, it is unfortunately impossible to decorate its internal region.

In the invention disclosed in patent document 1, the white (W) resin is used to express bright colors, and shading and gradation of colors that cannot be expressed only by the three colors Y, M, and C. It is, however, only the surface layer that can be decorated, and the invention does not implement internal decoration. Similarly to an ink used in two-dimensional (2D) printing, when an ink capable of coloring with one layer of the ink is used, and when a plurality of ink layers are deposited to form a decoration layer so as to form a three-dimensional object, the ink itself has a fixed concentration and cannot be partially controlled. Due to properties of subtractive mixing, therefore, the color gets darker and looks blackish each time a color layer is deposited on another whatever color is used. This hinders expression of color shading and gradation. That is, in a case of decorating the inside, color development in full color is unfortunately impossible. Consequently, such internal decoration of an object that the object looks a target color as viewed in any direction, and that the object is colored and has image depiction in any cross-section cannot be implemented.

It is an object of the present invention to provide a method for producing a three-dimensional object, and a forming apparatus that ensure such internal decoration that the object looks a target color as viewed in any direction, and that the object is colored and has image depiction in any cross-section.

Means of Solving the Problems

In order to achieve the object, according to the invention recited in claim 1, there is provided a method for producing a three-dimensional object by extruding a build material to form a layer corresponding to each of cross-sections obtained by slicing a target object by a plurality of parallel planes, and depositing the layers in sequence so as to form the three-dimensional object. A white material and one or two or more decoration materials of colors other than white, which solidify under a predetermined condition after extruded from nozzles, are used as the build material. The decoration materials and the white material are mixed to form the layer. In this case, forming the layer by mixing the decoration materials and the white material may refer to forming a layer that constitutes a partial region of the three-dimensional object (a region that affects visual recognizability results from the outside).

According to the invention recited in claim 2, in the method for producing the three-dimensional object recited in claim 1, the decoration materials and a clear material are mixed to form a region surrounding a region formed of the decoration materials and the white material. In this case, it is considered that the decoration materials and the clear material are mixed to form at least one outermost layer of the three-dimensional object.

According to claim 3 and claim 4, in the methods for producing the three-dimensional object respectively recited in claim 1 and claim 2, the layers in which the white material and the one or two or more decoration materials are mixed are superposed on one another to form a decoration layer including a plurality of the layers. Among the plurality of the layers that constitute the decoration layer, dot positions of the decoration material in an identical color do not overlap each other at least between each adjacent pair of the layers. In this case, more preferably, among the plurality of the layers, namely, a predetermined number (a predetermined integer of 3 or more) of layers that are deposited continuously, dot positions of the decoration material in an identical color not overlap each other.

As a method of control for preventing dot positions of the decoration material from overlapping each other, it is considered to, for example, shift a mask to select dot positions (dither mask) layer by layer. In this case, more specifically, a method for translation of the mask, a method for rotating the mask, and other methods are considered. It is considered that kinds of the mask (mask kinds) for use are changed layer by layer. It is also considered that three-dimensional masks (such as three-dimensional dither masks) are used. In a case of using error diffusion, it is considered that the weight of error diffusion is changed layer by layer (error diffusion is made random), and error diffusion is three-dimensionally performed, for example.

According to the invention recited in claim 5, in the method for producing the three-dimensional object recited in any one of claims 1 to 4, the build material includes ultraviolet curable inks.

According to the invention recited in claim 6, a forming apparatus extrudes build material to form a layer corresponding to each of cross-sections obtained by slicing a target object by a plurality of parallel planes, and deposits the layers in sequence so as to form a three-dimensional object. A white material and one or two or more decoration materials of colors other than white, which solidify under a predetermined condition after extruded from nozzles, are used as the build material. The decoration materials and the white material are mixed to form the layer.

Effects of the Invention

According to the method for producing the three-dimensional object recited in claim 1, the decoration materials (materials except white materials) and the white material are mixed in the cured build material in such a manner that light, which has passed through the decoration material, is reflected by the white material around the decoration material, or light, which has been reflected by the white material, passes through the decoration material. Since such light enters the human eyes, both of subtractive mixing and juxtaposition mixing implement development of a vivid color. Moreover, a covering property of the white material prevents the light from reaching a predetermined depth or more The color is completed (saturated) and changes no longer. Consequently, even in a case of color reproduction that is not affected by the thickness of the object, that is, even when the object is decorated inside, the color does not become so deep that it gets dark or looks blackish. This implements such internal decoration of the three-dimensional object produced that the object looks a target color as viewed in any direction, and that the object is colored and has image depiction in any cross-section. That is, this implements coloration of the inside of the three-dimensional object.

Since the light, which has been reflected by the white material inside of the three-dimensional object, is seen through the decoration material, deep colors and light colors can be made by adjusting the content of the decoration material without changing the content of the white material so as to implement gradation expression. Besides, the decoration material and the white material are extruded from different nozzles, and after the materials land, the materials are mixed. This ensures that combination ratios of the materials are adjusted to change the color. This implements internal decoration with gradation and decoration in full color. Furthermore, as the build material, materials or inks having different curabilities may be combined to change texture (material properties).

It should be noted that the decoration materials and the white material are not to be limited to specific materials. Preferably, however, materials such as ultraviolet curable inks, electro-beam curable inks, thermosetting inks, and hot-melt resins that solidify under a predetermined condition after extruded from the nozzles may be used in this case, the materials solidifying refers to materials curing owing to, for example, polymerization reaction. Moreover, preferably, after extruded from the nozzles, the materials instantaneously solidify the moment the materials land. More preferably, the materials be ultraviolet curable inks and electro-beam curable inks. Most preferably, the materials be ultraviolet curable inks.

According to the method for producing the three-dimensional object recited in claim 2, in place of the white material, the clear material is mixed in the outer circumferential portion of the three-dimensional object. Consequently, even when an error at the time of extrusion, for example, degrades ink-landing accuracy of the decoration material, the white color is prevented from looking unmixed and conspicuous on the surface of the three-dimensional object.

According to the methods for producing the three-dimensional object recited in claim 3 and claim 4, the dot positions of the decoration material in an identical color in the layers deposited in the layered direction of the decoration layer are displaced from each other layer by layer so as to appropriately prevent deposition of the dot positions from increasing granular texture. This ensures suitable coloring that eliminates or minimizes granular texture.

According to the method for producing the three-dimensional object recited in claim 5, it is ensured that each of the layers that constitute the three-dimensional object is formed more appropriately.

According to the method for producing the three-dimensional object recited in claim 6, the same effect as in the invention recited in claim 1 can be obtained.

BRIEF DESCRIPTION OF THE DRAWINGS

FIG. 1 is a diagram schematically illustrating colored cross-sections of an internal-decoration three-dimensional object according to the present invention, in which (A) illustrates a case of a deep color, and (B) illustrates a case of a light color

FIG. 2 is a diagram illustrating one example of the three-dimensional object according to the present invention, in which (A) is a perspective view as viewed from an upper side of the front, and (B) is a cross-sectional view.

FIG. 3 is a diagram illustrating an exemplary decoration layer of the internal-decoration three-dimensional object according to the present invention in a case of light blue, in which (A) is a diagram illustrating the decoration layer, and (B) is a diagram illustrating a principle of reflection. FIG. 4 illustrates gamuts (color gamuts) in a coordinate system consisting of the a*-axis and the b*-axis, which are results of evaluation of color development properties when a film thickness was 66 to 120 μm (5 layers) using a 6-fold dilute solution of a white ink (evaluation was performed as to a hue of each mixture when the white ink had 100% ink printing density per layer and when each color ink had 1 to 10% ink printing density per layer).

FIG. 5 illustrates gamuts in the coordinate system consisting of the a*-axis and the b*-axis, which are results of evaluation of color development properties when a film thickness was 198 to 360 μm (15 layers) similarly using the 6-fold dilute solution of the white ink (evaluation was performed as to a hue of each mixture when the white ink had 100% ink printing density per layer and when each color ink had 1 to 10% ink printing density per layer).

FIG. 6 illustrates gamuts in the coordinate system consisting of the a*-axis and the b*-axis, which are results of evaluation of gradation properties when a film thickness was 378 to 540 μm (30 layers) using the 6-fold dilute solution of the white ink (evaluation was performed as to a hue of each mixture when the white ink had 100% ink printing density per layer and when each color ink had 5 to 50% ink printing density per layer (in a state in which an ink limit was set at 50%)).

FIG. 7 is a graph illustrating a relationship between printing density and reflection density of each of process color inks, illustrating results of evaluation of gradation properties when a film thickness was 378 to 540 μm (30 layers) similarly using the 6-fold dilute solution of the white ink (evaluation was performed as to a hue of each mixture when the white ink had 100% ink printing density per layer and when each color ink had 5 to 50% ink printing density per layer state in which an ink limit was set at 50%)).

FIG. 8 illustrates gamuts in the coordinate system consisting of the a*-axis and the b*-axis to compare color reproducibilities in 2D color printing and the internal-decoration three-dimensional object according to the present invention.

FIG. 9 is a diagram illustrating an exemplary apparatus to form the internal-decoration three-dimensional object according to the present invention.

MODES FOR CARRYING OUT THE INVENTION

Figure 1:
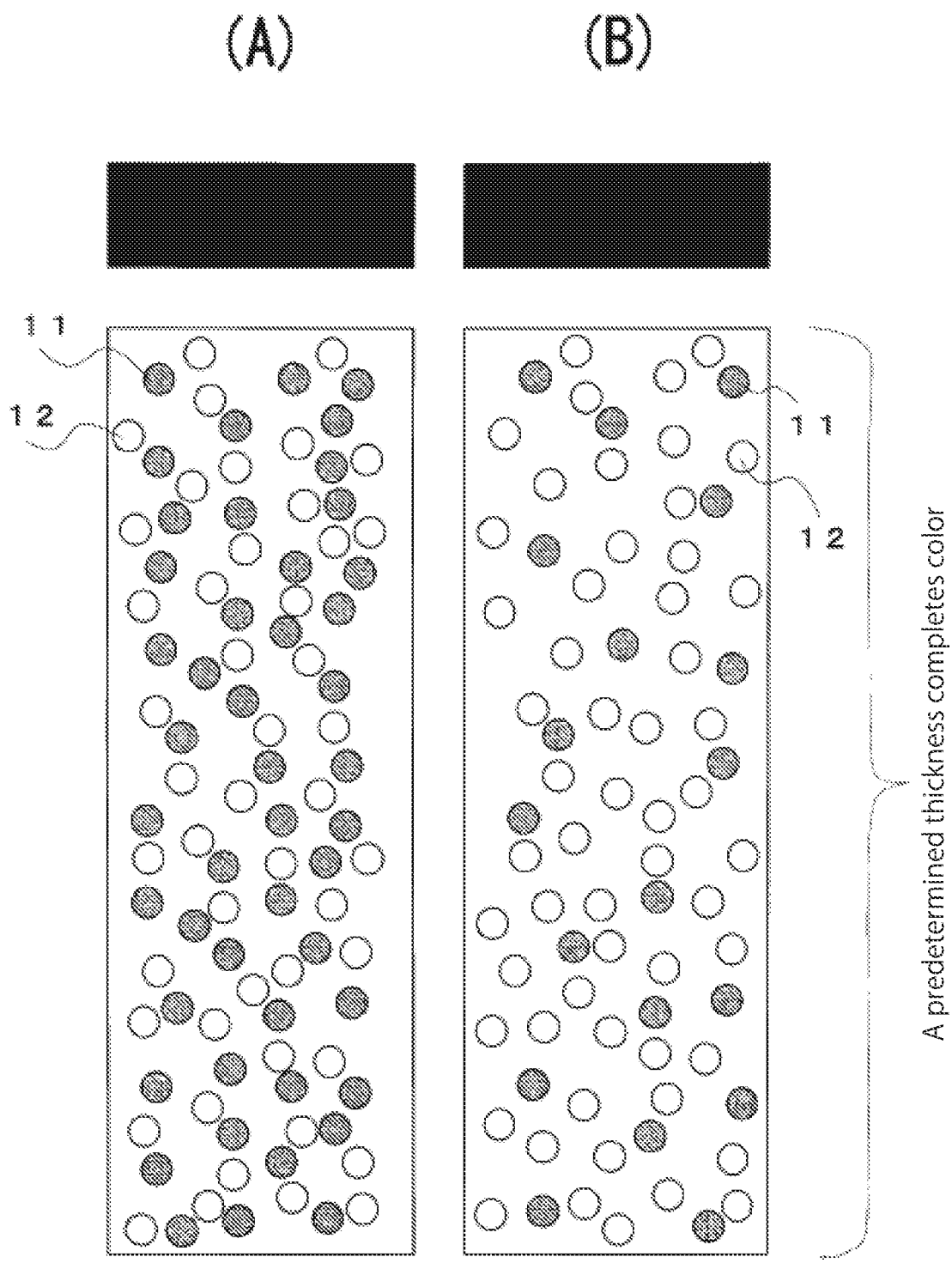
[FIG. 1]

A configuration of the present invention will be described in detail below based on an embodiment illustrated in the drawings.

FIG. 1 schematically illustrates colored cross-sections of an internal-decoration three-dimensional object produced by a production method according to one embodiment of the present invention. The three-dimensional object 10 according to this embodiment is formed by slicing a target object into cross-sections by a plurality of parallel planes, forming a layer, which corresponds to each of the cross-sections, by ejecting build material in the form of minute particles, and depositing such layers in sequence. Specifically, the build material, which is extruded from nozzles and instantaneously cured the moment it lands, is ejected in the form of minute particles by an ink-jet printer. Thus, at the same time as the formation process, coloring is performed to obtain the three-dimensional object 10 with decoration not only on the surfaces but also in the entire internal areas. The decoration includes coloring and image depiction in full color and with shading and gradation of colors.

The build material that constitutes the three-dimensional object 10 includes a white material 15 and one or two or more decoration materials 13 of colors other than white. The white material 15 and the decoration materials 13 are extruded and instantaneously cured the moment they land. While the white material 15 and the one or two or more decoration materials 13 are simultaneously extruded and mixed, layers of these materials are deposited. Thus, formation and decoration of the three-dimensional object 10 are performed at the same time, In this embodiment, a white (W) ultraviolet curable ink is used. as the white material 15. As the one or two more decoration materials 13 of colors other than white, ultraviolet curable inks of yellow (Y), magenta (M), cyan (C), and as necessary, black (K) are used. Also, as necessary, a clear material (transparent material) 14 is used as the decoration material. As this clear material 14, an ultraviolet-curable clear (CL) ink is used. The decoration materials are what is called color model materials. In this embodiment in which the ultraviolet curable inks are used, the decoration materials will be referred to as decoration inks as well. The white material is what is called a white model material. In this embodiment in which the ultraviolet curable ink is used, the white material will be referred. to as white ink as well.

The decoration ink and the white ink are simultaneously extruded from different nozzles, and while these inks are mixed on the landing plane, layers of the inks are deposited. This results in cured inks in which, as illustrated in FIG. 1, a decoration pigment (color pigment) (at least one or two or more of Y, M, C, and as necessary, K) 11 of the decoration ink and a white pigment 12 are mixed. In the configuration illustrated in FIG. 1, portions other than the decoration pigment 11 and the white pigment 12 are formed of binder resin, for example, of the inks. This mixed state causes light, which has passed through the decoration pigment 11, to be reflected by the white pigment 12 around the decoration pigment 11, or light, which has been reflected by the white pigment 12, to pass through the decoration pigment 11. Since such light enters the human eyes, both of subtractive mixing and juxtaposition mixing implement development of a vivid color. Moreover, a covering property of the white pigment 12 prevents the light from reaching a predetermined depth or more. This was also made clear in experiments by the inventor of the present invention and others. At approximately the fifth layer from the surface, the color is completed (saturated) and changes no longer. Consequently, even if the object has 200 to 300 layers, that is, even if the object has such internal decoration that the object is decorated as deep as the center or deep layers, the color does not become so deep that it gets dark or looks blackish. This implements color reproduction that is not affected by the thickness of the object. Furthermore, this implements such internal decoration that the object looks a target color as viewed in any direction, and that the object is colored and has image depiction in any cross-section.

Both of subtractive mixing and juxtaposition mixing are adopted to ensure expression of mixed color and color gradation. Generally, in order to perform coloring, it suffices that three primary colors of Y, M, and C are mixed. In order to express color shading, however, it is effective to extrude the clear ink 14 at the same time as the decoration inks 13 of the three primary colors so as to mix the colors based on an area distribution.

The decoration ink 13 and the white ink 15 are extruded from the different nozzles, and after the inks land, the inks are mixed. This ensures that without changing the content of the white pigment 12, the content, namely, a combination ratio of the decoration pigment 11 is adjusted to change gradation. Even with the same content of the white pigment 12, the color looks deep on the surface of the object when the content of the decoration pigment 11 is increased (see FIG. 1(A)), and the color looks light on the surface of the object when the content of the decoration pigment 11 is decreased (see FIG. 1(B)). Although a cyan pigment is taken as an example in the description referring to FIG. 1, the same applies to all of the four colors, namely, Y, M, C, and as necessary, K, which are referred to as process colors. Further, the same applies to other colors such as R (red), G (green), and B (blue) produced by combining these process colors. It is ensured that the content, namely, a combination ratio of the decoration pigment 11 is adjusted to change gradation. At the same time, it is ensured that the contents of a plurality of decoration pigments 11 are adjusted to change color depth. When light blue is developed, as illustrated in FIG. 3(A), required amounts of decoration pigments M, C, and CL are mixed in such a manner that predetermined amounts of the decoration materials 13 containing the decoration pigments 11 are dispersed in one layer. Thus, as illustrated in FIG. 3(B), light blue is seen on the surface of the object as viewed in any direction. This implements both of internal decoration with gradation and decoration in full color. Concerning squares in the drawing, the clear (CL) ink is ejected onto those of the squares which have no symbols.

Figure 3:
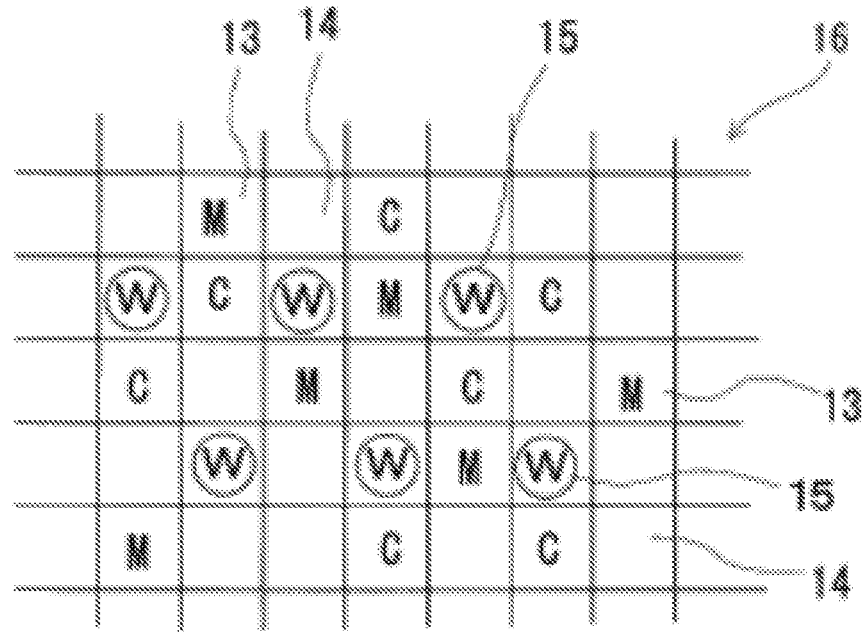
[FIG. 3]
Figure 3:
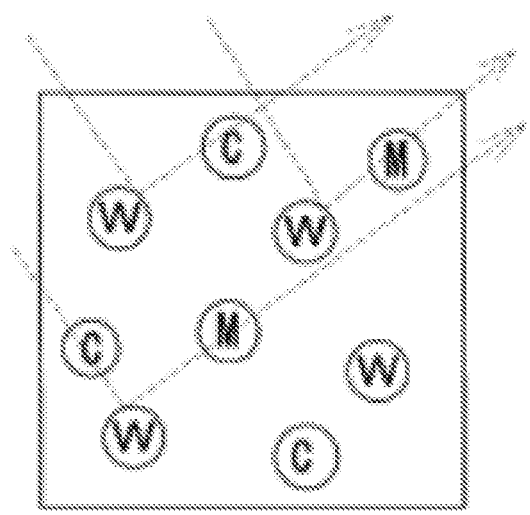

As an exemplary decoration layer of the internal-decoration three-dimensional object according to the present invention, a case of decoration in light blue is illustrated in FIG. 3. In this case, the internal-decoration three-dimensional object 10 refers to an internal-decoration three-dimensional object 10 including a decoration layer 16 at least on an outer circumferential portion of the three-dimensional object 10. In this case, the outer circumferential portion of the three-dimensional object 10 refers to a portion that affects visual recognizability results of, for example, colors that are recognized from the outside. The decoration layer 16 refers to a layer provided with decoration (coloring, for example) that affects visual recognizability results of the three-dimensional object 10. The decoration layer 16 includes a plurality of layers deposited on top of each other in each of which the white material and the one or two or more decoration materials are mixed. More specifically, in the internal-decoration three-dimensional object 10 illustrated in the drawing, while extrusion amounts of the decoration materials 13 of M and C are reduced, an amount corresponding to the reduction is compensated for by the clear material 14, as illustrated in FIG. 3(A), to decrease ink concentrations of the decoration materials 13. These materials are mixed based on an area distribution to make the three-dimensional object 10 look light blue. In this case as well, on the surface of the three-dimensional object 10, as illustrated in FIG. 3(B), light, which has passed through the decoration color, is reflected by the white ink 11 around the decoration color, or light, which has been reflected by the white ink 15, passes through the decoration color. Since such light enters the human eyes, both of subtractive mixing and juxtaposition mixing implement development of a vivid color.

In internal decoration of the three-dimensional object 10, as described above, the light reflected by the white pigment 12 inside is seen through the decoration pigment 11, or the light that has passed through the decoration pigment 11 is reflected by the white pigment 12 around the decoration pigment 11 and seen. In view of this, a determination as to the content or a mixing amount of the white pigment 12 is suitably made based on a setting of thickness in which the color is completed. There is a significant difference in influence on display of the color of the decoration pigment between when the white pigment is superposed on the decoration pigment and when the white pigment is disposed under the decoration pigment. Moreover, when white is too deep, a difference between in colors on a surface and a back side of a printed layer is too large to reproduce a desired color effectively by the decoration pigment. In contrast, when white is too light, the background is apt to cause an influence. In view of this, it is necessary to make white deep to some degree. When white is too deep, however, an increase in the difference between the colors on the opposite sides of the printed layer is not considered to be preferable. Consequently, a white ink thinner than a white ink for 2D printing, and the decoration ink are simultaneously extruded to be mixed in such a manner that the white pigment 12 is dispersed around the decoration pigment 11 inside of the cured inks, as illustrated in FIG. 1, In this case, the thinner white ink refers to a white ink having such a concentration that when a layer of the ink is formed to have a preset single-layer thickness, the ink does not completely reflect light but allows part of the light to transmit. More specifically, the thinner white ink may refer to an ink having such a concentration that when a layer of the ink is formed to have a preset single-layer thickness, the ink allows 10% or more of light to transmit. A transmission amount of the light may be 20% or more.

The inventor of the present invention and others performed evaluation of mixing properties of a white ink and color inks using, among ultraviolet curable inks made by MIMAKI ENGINEERING CO., LTD., White (trade name: UV Ink LH-100 W, product No. SPC-0597W), Cyan (trade name: UV Ink LH-100 C, product No. SPC-0597 C), Magenta (trade name: UV Ink LH-100 M, product No. SPC-0597M), Yellow (trade name: UV Ink LH-100 Y, product No. SPC-0597Y), and Clear (UV Ink LH-100CL, product No. SPC-0597CL). In combination of these inks, it was proved that when the white ink is too thick, mixing is difficult (an average value of color differences between a surface and a back side of one layer at the time of printing the one layer is increased to disadvantageously cause a significant change in how the printed layer looks depending on directions in which the layer is viewed). It was proved that when the white ink is too thin, the way the layer looks is susceptible to an influence of backing (background). In view of this, in a case of the known white ink containing a white pigment of a predetermined concentration (trade name: UV Ink LH-100 W, product No. SPC-0597W), preferably, a 6-fold to 11-fold dilute solution be used. More preferably, the 6-fold dilute solution be used. Normally, in a case of a 2D-printing white ink, the white ink contains 10 to 15% white pigment. Consequently, although the concentration of the white pigment in the white ink should not be limited to a particular concentration, preferably, a white ink diluted to a solution having 1 to 2% white pigment, more preferably, a white ink diluted to a solution having approximately 2% white pigment be used. Then, preferably, coloring be performed by mixing required amounts of color inks with 100% of the white ink having such a pigment concentration of 1 to 2%.

The inventor of the present invention and others performed evaluation tests of the present invention using, among ultraviolet curable inks made by MIMAKI ENGINEERING CO., LTD., White (trade name: UV Ink LH-100 W, product No. SPC-0597W), Cyan (trade name: UV Ink LH-100 C, product No. SPC-0597 C), Magenta (trade name:

UV Ink LH-100 M, product No. SPC-0597M), Yellow (trade name: UV ink LH-100 Y, product No. SPC-0597Y), and Clear (UV Ink LH-100CL, product No. SPC-0597CL). The evaluation tests as to these inks performed by the inventor of the present invention and others revealed that a. color gamut is wide and favorable when 100% of the white ink, which is a 6-fold dilute solution, has a color combination concentration of 50%.

In view of this, it is considered to be preferable that in order to obtain the internal-decoration three-dimensional object 10 using the above-described UV (ultraviolet) inks, the color combination concentration 50% per layer be set as an ink limit, and 100% of the white ink be extruded. In this connection, in a case of using 1 color ink, for example, Cyan, 50% coloring ink and 100% white ink make a total ink amount 150%, and consequently, an ink thickness per layer at this time is 18 µm. Ina case of using 2 color inks, for example, C and M, 50% C, 50% M, and 100% white ink make a total ink amount 200%, and consequently, an ink thickness is 24 µm. In a case of using 3 color inks, for example, C, M, and Y, 50% C, 50% NI, 50% Y, and 100% white ink make a total ink amount 250%, and consequently, an ink thickness is 30 µm.

It should be noted that in actual formation, in order to keep a thickness of each layer constant, it is preferable to keep a total ink amount constant in some cases. In such cases, it is preferable that while the above-described ratios are maintained as to the coloring ink and the white ink, adjustment be performed appropriately to keep the total ink amount at a preset constant value. This configuration ensures that a film thickness of each layer to be formed is controlled to be constant.

In the above-described embodiment, the ultraviolet curable inks are used as the build material. This, however, should not be construed in a limiting sense. As the occasion demands, it is possible to use curable inks that are cured when irradiated with light other than ultraviolet light (such as visible light) and electron beams (EB: electron beam), and thermosetting inks. In such a case, however, although no ultraviolet irradiator is necessary, an energy-ray emitter or similar device to cure inks attached on a stage is required. Needless to say, in use of hot-melt resins, a heater is required to feed the resins in molten states to nozzles.

Figure 9:
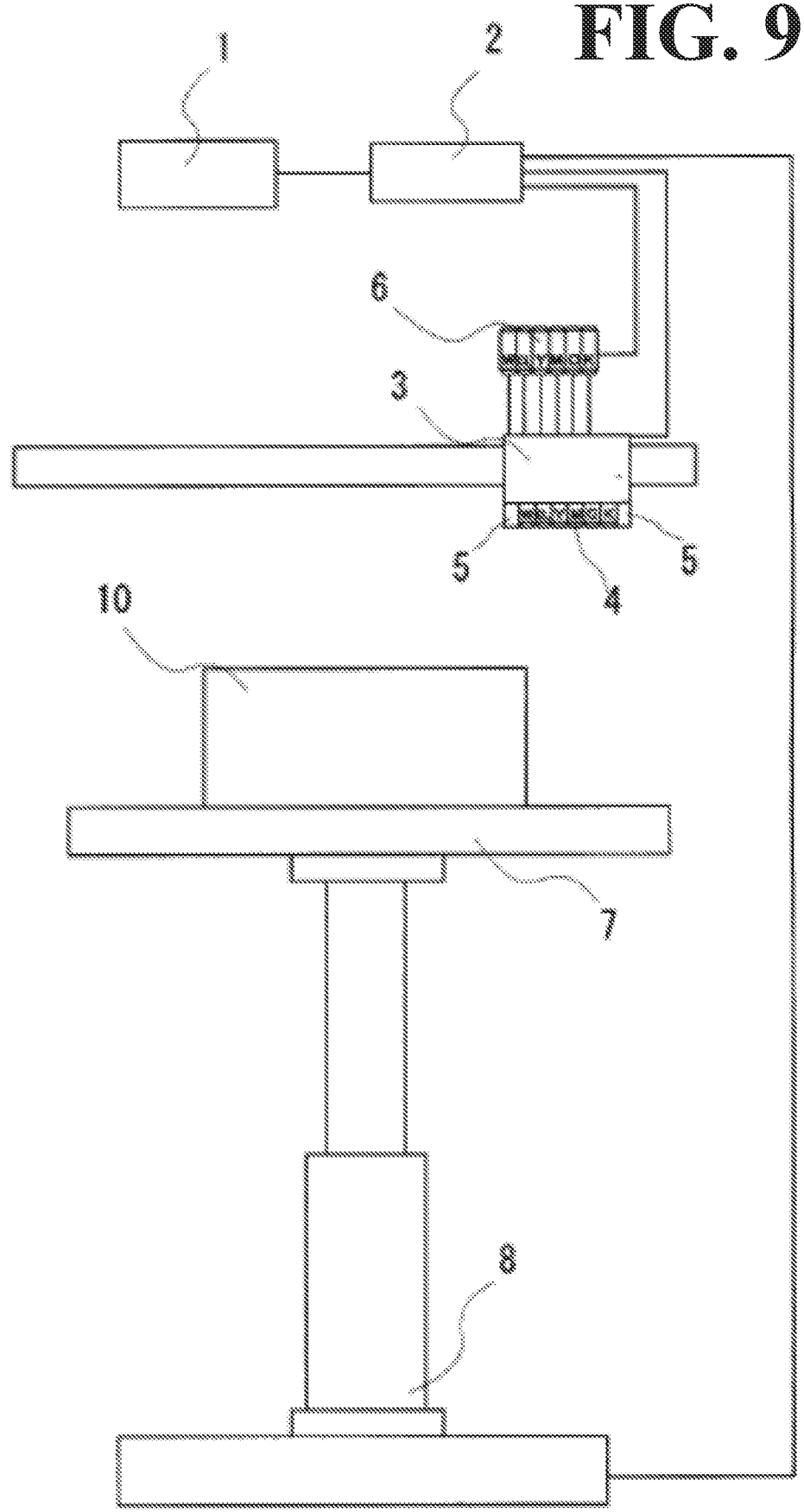
[FIG. 9]

FIG. 9 is a diagram illustrating an exemplary three-dimensional forming apparatus. This three-dimensional forming apparatus includes a computer 1, a drive controller 2, an XY direction driver 3, a Z direction driver 8, a nozzle head 4, a tank unit 6, ultraviolet irradiators 5, and a stage 7.

The computer 1 converts a target object having a three-dimensional shape into data, slices the data into multiple thin cross-sectional pieces to generate cross-sectional data, and outputs the cross-sectional data to the drive controller 2. At the same time, the computer 1 outputs to the drive controller 2 information regarding thickness of deposited layers in formation of the target object. Specifically, the model data is sliced into the cross-sectional pieces at a thickness pitch corresponding to a thickness of one of ink layers deposited in the vertical axis direction so as to generate data of cross-sectional shapes and coloring regions. That is, a cross-sectional piece sliced from the model data is fractionated in a grid pattern and converted into cross-sectional data in which each position in each layer has color information. It should be noted that color three-dimensional model data generated by three-dimensional CAD modeling software in general use may be employed as data of the target object, Also, shape data and texture measured by a three-dimensional shape input device may be employed.

The drive controller 2 obtains cross-sectional data from the computer 1, sends drive commands to drivers of the XY direction driver 3, the Z direction driver 8, the ultraviolet irradiators 5, the nozzle head 4, and the stage 7 based on the cross-sectional data, and controls movements of these components so as to deposit a cross-sectional shape of each layer on the stage 7. In the drive controller 2, data conversion means, not illustrated, performs data conversion such as gradation conversion of the cross-sectional data so as to generate information as to layer shapes and coloring, for example, that are suitable for sizes of droplets extruded from extrusion nozzles. In accordance with the layer shapes and coloring information generated by the data conversion, the drive controller 2 sends a drive command to the XY direction driver 3 to move the nozzle head 4 in a predetermined direction, and also, causes each of the extrusion nozzles to extrude an ink appropriately along with the movement. In response to a command from the drive controller 2, the nozzle head 4 extrudes ultraviolet curable inks in the form of droplets so as to form the three-dimensional object 10 on the stage 7 based on the cross-sectional data provided from the computer 1.

In this control, when predetermined gradation conversion is performed in the drive controller 2, multi valued gradation data of the cross-sectional data is converted into binary data corresponding to each position in each layer. This binary data serves as information for ON/OFF control of each nozzle of the nozzle head 4. Gradation expression is performed by changing the density of extremely small dots extruded onto each layer. Colors are expressed by combining colors of the dots. In accordance with a preset concentration resolution, positions of the dots jetted to each layer are determined. This, however, is in a case that gradation has 256 levels in the cross-sectional data. In a case of conversion into binary data for the ON/OFF control without decreasing the levels of gradation, 256 extrusion regions are determined in a predetermined area.

When the same gradation is to be displayed in a plurality of predetermined areas adjacent to each other, and when the same extrusion pattern is used, a regular arrangement of the pattern may cause other patterns that the target object does not have to appear on the surface of the three-dimensional object 10 in some cases. In order to avoid such a situation, even though the same gradation is to be displayed, it is preferable to change dot positions in a layer-by-layer basis. In this case, the drive controller 2 functions as extrusion pattern determination means for changing extrusion patterns from the respective nozzles so as to prevent other patterns that the target object does not have from appearing on the three-dimensional object 10.

The XY direction driver 3 is drive means provided to move the nozzle head 4 in a plane specified by 2 axes, namely, the X-axis and the Y-axis, which are perpendicular to each other in a horizontal plane. Based on a drive command from the drive controller 2, the XY direction driver 3 enables the nozzle head 4 to move to a desired position within a drivable range in the plane. The nozzle head 4 may move relative to the stage 7, and while the nozzle head 4 is fixed, the stage 7 may be moved horizontally in the XY plane.

The Z direction driver 8 includes drive means for moving the stage 7 in the vertical axis (Z-axis) direction. Based on a drive command from the drive controller 2, the drive means lowers the stage 7 each time one layer or several layers of the three-dimensional object 10 are formed on the stage 7. This movement of the stage 7 maintains the three-dimensional object 10 deposited and built on the stage 7, and the nozzle head 4 at a predetermined interval without coming into contact with each other. It suffices that the vertical movement of the stage 7 is a relative movement. As the occasion demands, while the stage 7 is fixed, the nozzle head 4 may be moved vertically.

The nozzle head 4 is mounted on the XY direction driver 3 and provided to be movable in the XV plane, This nozzle head 4 includes a plurality of nozzles to extrude the respective UV curable inks as the decoration material and the build material fed from the tank unit 6. Each of the nozzles is individually controlled by the drive controller 2 so as to eject an ultraviolet curable ink in the form of minute droplets onto a calculated position on the stage 7 or onto a position on the three-dimensional object 10 in progress of formation on the stage 7.

With the apparatus having the above-described configuration, therefore, when extrusion of the inks is performed for portions of the three-dimensional object 10 to be colored, any one or more of the inks Y, M, C, and CL having ink concentrations adjusted based on coloring information and gradation expression obtained from the target object, and the white ink having an amount to keep the white-pigment content constant are extruded to form the three-dimensional object 10 and provide the object with desired decoration at the same time.

It should be noted that the concentration of the white pigment in each layer is appropriately adjusted by changing a ratio of application amounts of the clear ink (CL) and the white ink. In this case, the concentration of the white pigment is changed to make depth of the color vary in different manners until the color is saturated.

Figure 2:
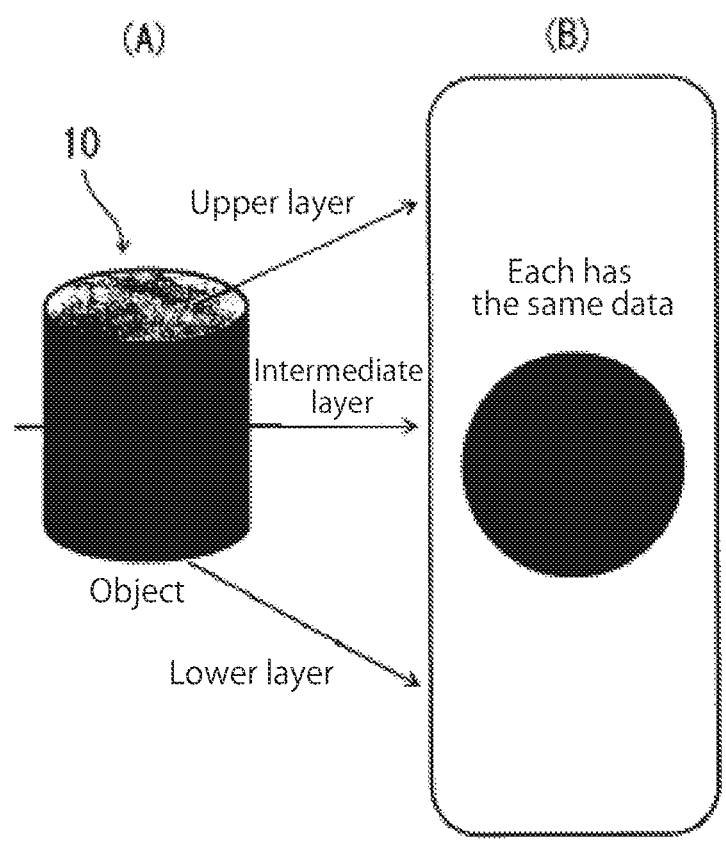
[FIG. 2]

The method for forming the internal-decoration three-dimensional object 10 will now be described with an exemplary case of obtaining the three-dimensional object 10 having a solid cylindrical shape illustrated in FIG. 2 using the apparatus illustrated in FIG. 9.

First, the stage 7 is elevated to a position suitable for extruding and forming a cross-sectional shape of a first layer, namely, a first layer. Thus, the stage 7 and the nozzle head 4 have such a predetermined positional relationship that an ink extruded from each of the extrusion nozzles of the nozzle head 4 is attached to an appropriate position on the stage 7.

When the movement of the stage 7 is ended, the XY direction driver 3 is driven in accordance with information concerning layer shapes and coloring, for example, suitable to the size of droplets extruded from each of the extrusion nozzles, which information has been generated by the drive controller 2 based on the cross-sectional data from the computer 1. Thus, the nozzle head 4 is moved in a predetermined direction, and also, the inks are extruded. from the respective extrusion nozzles as desired. The decoration inks 13 and the white ink 15 are extruded onto each predetermined dot position on the stage 7 to form the circular object.

The decoration inks 13 and the white ink 15, which have been extruded onto the stage 7, are instantaneously cured when receiving corresponding energy. In a case of using UV curable inks, the inks instantaneously solidify when receiving ultraviolet light from the ultraviolet irradiators 5 (UV lamps) disposed on opposite ends of the head in a main scanning direction. Although not illustrated, in a case of using EB curable inks, the inks instantaneously solidify when receiving electron beams (electro-beams) from EB emitters disposed on opposite ends of the head in the main scanning direction. Alternatively, in a case of using thermo-setting inks, the inks are cooled by spontaneous heat radiation or cooling means, not illustrated, disposed inside of the stage, and changed from a molten state to a solid to be cured.

When 1 operation of main scanning is completed in this manner, the head is moved in a sub-scanning direction as necessary depending on a relationship between a main-scanning width of the head and a width of the three-dimensional object 10, and the main scanning operation is further repeated on the same plane. Thus, one plane or one layer, which is a cross-sectional piece corresponding to one layer of the three-dimensional object 10, is formed.

When formation of the one layer is ended, the drive controller 2 determines that formation of the one layer has been ended, lowers the stage 7 by a distance corresponding to the height of the formed one layer, and corrects a positional relationship between the nozzle head 4 and the object deposited on the stage 7 at the time of formation of a next layer into an appropriate positional relationship. Then, the decoration inks 13 and the white ink 15 are extruded again from the ink-jet head onto the circular object previously formed, and circular layers are deposited in the vertical axis direction (elevation direction of the stage 7).

Such layers corresponding to the height of the three-dimensional object 10 are deposited while the stage 7 is moved so as to form the three-dimensional object 10 having a desired shape. In other words, the above-described operation is repeated times corresponding to the number of cross-sectional pieces sliced from the model data so as to deposit the layers in sequence on the stage 7 layer by layer until the three-dimensional object 10 equivalent to the target object is finally formed on the stage 7.

Thus, with the white ink 15 and the decoration inks 13 extruded onto the positions calculated in accordance with the layer shapes and coloring information generated by the data conversion, the decoration layer 16 (not only colored but also including image depiction such as patterns) is deposited to form the three-dimensional object 10 illustrated in FIG. 2(A), which has an inside distinguished in colors by desired coloring and image depiction.

Although the above-described embodiment is one exemplary preferred embodiment of the present invention, this should not be construed in a limiting sense. Without departing from the scope of the subject matter of the present invention, various modifications are possible. In the above-described embodiment, the description mainly refers to an example in which formation is performed based on the same coloring data from the start to the end (namely, from the surface to the internal center) to obtain the same coloring on the surface and in any cross-section. This, however, should not be construed in a limiting sense. As necessary, the coloring and the content of image depiction may be partly changed. Similarly to a fruit having peel and flesh that are different in coloring and pattern, surface coloring and image depiction may be made different from inside coloring and image depiction. In those portions which require no coloring and no image depiction, the white ink or an achromatic or non-coloring ink may be used.

In the above-described embodiment, the three-dimensional object 10 is formed by depositing layers in which the decoration inks 13 and the white ink 15 are mixed. The decoration inks 13 include the process inks of the four colors Y, M, C, and as necessary, K, and inks of other colors. This configuration, however, should not be construed in a limiting sense. As the occasion demands, layers only formed of the white ink 15 or layers formed of coloring inks other than white or a transparent ink may be partly provided.

In the above-described embodiment, coloring is performed in such a manner that the decoration inks 13 and the white ink 15 are mixed in each of the layers from the surface to the internal center. This, however, should not be construed in a limiting sense. In particular, at least one layer, which constitutes the surface of the three-dimensional object may be made to contain no white ink 15. In jetting the white ink 15 and the color inks 13 together, when ink-landing accuracy (ink-landing positional displacement) is inferior, the white color looks unmixed and conspicuous in some cases. In view of this, for at least one layer (thin coating) on the outermost surface, the clear ink 14 is jetted in place of the white ink 15 so as to perform surface decoration in which the clear ink 14 and the color inks 13 are mixed. This case implies elimination of at least one layer into which the white ink 15 is jetted because external dimensions of the object are determined. In other words, the clear ink 14 is jetted into the last layer, to which the white ink 15 is originally intended to be jetted, so as to prevent the white color from being exposed in an external appearance of the object.

As described above, in formation using the decoration inks 13 and the white ink 15, the covering property of the white pigment of the white ink 15 stops light from reaching a predetermined depth or more, and the color is completed (saturated) and no longer changes. Consequently, formation of the inside (the center and its vicinity) of the three-dimensional object 10 may not be necessarily performed by using the decoration inks 13 and the white ink 15. That is, it is considered to form the internal region, which does not affect the visual recognizability results of the three-dimensional object 10, of a material (ink) of an optional color.

Since a great number of decoration layers 16 are deposited on top of each other to form the internal-decoration three-dimensional object 10, the object may have an external appearance with granular texture in some cases. More specifically, when positions in each layer in which dots are jetted are determined by a dither matrix, normally, determination as to ink concentrations leads to determination as to positions of dots jetted into squares of the matrix in each layer by the dither matrix in advance. As a result, in deposition of a plurality of layers, dots are further jetted into the same position in upper layers. Therefore, the dot positions are superposed on each other to increase the granular texture. In view of this, such processing is performed that the positions of dots are displaced from each other between each adjacent pair of the layers. For example, it is considered that the dither matrix is changed layer by layer to prevent superposition of color dots. A decrease in the superposition of color dots results in a decrease in lightness difference between the color dots and the white color of the inner build region so as to reduce the granular texture. As used herein, jetting dots while displacing their positions from each other between each adjacent pair of the layers may refer to jetting dots while completely displacing their positions from each other in some cases and may also refer to jetting dots while slightly displacing their positions from each other and partly superposing the positions on each other. The processing for displacing the dot positions from each other may not be necessarily performed for all of the layers. It is still effective to perform such processing at some intervals.

A configuration for displacing dot positions from each other between each adjacent pair of layers will be described in more detail below. As described above, in order to reduce granular texture, it is preferable to displace dot positions from each other between each adjacent pair of the layers. In this case, among a plurality of layers that constitute the decoration layer 16, it is at least preferable to prevent dot positions of the same color ink 13 from overlapping each other between each adjacent pair of the layers. This configuration ensures that dot positions of the same color ink 13 are appropriately displaced from each other, and that lightness difference generated between the color ink 13 and the white ink 15 is appropriately reduced, This also ensures that individual dots of the color ink 13 are made inconspicuous to suitably reduce the granular texture, for example.

In this case, as a specific method of control for preventing dot positions of the color ink 13 from overlapping each other, it is considered to, for example, shift a mask to select dot positions (dither mask) layer by layer. In this case, more specifically, a method for translation of the mask, a method for rotating the mask, and other methods are considered. The method for translation of the mask refers to a method for shifting the position of the mask layer by layer to displace the dot positions from each other. Shifting the position of the mask may refer to shifting the origin of application of the mask. In this case, the shifting direction may refer to any of the X direction only, the Y direction only, and the X and Y directions simultaneously. The shifting direction may also refer to a direction in which these directions are mixed. The X direction and the Y direction respectively refer to directions of the X-axis and the Y-axis in the XY direction driver 3. The shifting amount may be fixed (regular) or variable (random). The method for rotating the mask refers to a method for rotating the mask layer by layer to displace the dot positions from each other. In this case, the rotation angle may be suitably set at any value. The rotation amount may be fixed (regular) or variable (random).

Alternatively, it is considered that instead of shifting or rotating the mask, kinds of the mask (mask kinds) for use are changed layer by layer (variable mask) so as to displace the dot positions from each other. In this case, it is considered that a plurality of masks (dither matrices) are prepared in advance to make the masks different when used for each layer. It is also considered that in place of masks prepared with matrices on a two-dimensional plane, three-dimensional masks (such as three-dimensional dither masks) three-dimensionally prepared are used. In a case of using error diffusion, it is considered that the weight (variable) of error diffusion is made changeable layer by layer to change the weight to displace the dot positions from each other (for example, error diffusion is made random). In this case, the weight may be changed regularly or at random. Error diffusion three-dimensionally performed (three-dimensional error diffusion) to displace the dot positions from each other, for example, is also considered.

It should be noted that when thin ink (also referred to as light ink) having a low concentration of a pigment is prepared as the decoration material to increase the number of dots so as to reproduce a color having a desired depth, granular texture is reduced even without taking trouble to perform processing to displace the dot positions from each other layer by layer to prevent the dot positions from overlapping each other in the layered direction as described above. Moreover, since colors having less lightness difference from white, such as yellow, reduce granular texture, the processing for displacing the dot positions from each other layer by layer becomes unnecessary for these colors in some cases. That is, in a case of less lightness difference between the white material and the decoration material, the granular texture is lessened.

In this embodiment, the ultraviolet curable inks are used. This, however, should not be construed in a limiting sense. Inks and colored resins, which are extruded from nozzles and instantaneously solidify the moment they land, are applicable. Thermoplastic inks, photo-curable inks, and thermosetting inks may be used as well. In such cases, a inciter instead of the ultraviolet irradiator, and an energy ray emitter to cure the inks are necessary.

In the above-described embodiment, the description mainly refers to an example in which the ultraviolet curable inks of different colors are used to perform formation and internal decoration of the three-dimensional object 10 simultaneously. As the occasion demands, however, as the build material, materials or inks having different curabilities may be combined to partly or wholly change texture (material properties).

It is considered that further various modifications of this embodiment are possible other than the above-described changes. For example, it is also considered that a transparent layer of the clear material 14 is formed on the outermost portion (outside of the decoration layer 16) of the three-dimensional object 10. This configuration ensures that the outside of the three-dimensional object 10 is coated with the clear layer to protect the three-dimensional object 10 more appropriately.

Example 1

Among UV (ultraviolet light) curable inks made by MIMAKI ENGINEERING CO., LTD., White (trade name: UV Ink LH-100 W, product No, SPC-0597W), Cyan (trade name: UV Ink LH-100 C, product No. SPC-0597 C), Magenta (trade name: UV Ink LH-100 M, product No. SPC-0597M), Yellow (trade name: UV Ink LH-100 Y, product No. SPC-0597Y), and Clear (UV Ink LH-100CL, product No. SPC-0597CL) were used to perform evaluation as to mixing properties of the white ink and the color inks of 6 colors, namely, cyan, magenta, yellow, red, green, and blue.

An evaluation test was performed to evaluate a single-layer hue when one layer is printed by simultaneously extruding 100% of the white ink and 10 to 100% of each of the color inks by Ink-jet Printer UJF-3042HG made by MIMAKI ENGINEERING CO., LTD. It should be noted that in this evaluation test, the white ink is first extruded because of an arrangement of the head. As the white ink, marketed item, UV Ink LH-100 W prepared as it is (white ink not diluted), a solution of the white ink diluted 6 times with the clear ink (6-fold dilute solution), and a solution of the white ink diluted 11 times with the clear ink (11-fold dilute solution) were used for the evaluation. As used herein, the 6-fold dilute solution refers to a mixture of 1 part white ink and 5 parts clear ink, and the 11-fold dilute solution refers to a mixture of 1 part white ink and 10 parts clear ink.

As a result, when the white ink (trade name: UV Ink LH-100 W, product No. SPC-0597W) was used without dilution, average values of color differences between the surface and the back side of the printed layer were 4.03, 3.72, 7.07, 4.32, 7.75, and 4.47 respectively concerning cyan, magenta, yellow, red, green, and blue. That is, in this case, a maximum color difference 7 was observed.

When the 6-fold dilute solution of the white ink, which was obtained by diluting the white ink 6 times, was used, average values of color differences between the surface and the back side of the printed layer were 1.04, 0.93, 1.13, 1.43, 1.74, and 1.57 respectively concerning cyan, magenta, yellow, red, green, and blue. When the 11-fold dilute solution of the white ink, which was obtained by diluting the white ink 11 times, was used, average values of color differences between the surface and the back side of the printed layer were 1.05, 0.87, 0.89, 1.34, 1.47, and 0.92 respectively concerning cyan, magenta, yellow, red, green, and blue. That is, in the case of the 6-fold dilute solution of the white ink, the color differences were in a range of 0.93 to 1.74, and in the case of the 11-fold dilute solution of the white ink, the color differences were in a range of 0.89 to 1.47. This proved that as the concentration of the white ink is lower, a less color difference between the surface and the back side of the printed layer occurs.

Meanwhile, in a case of the white ink (trade name: UV Ink LH-100 W, product No. SPC-0597W) without dilution, average values of color differences between white and black backings were 4.69, 8.56, 13.43, 9.78, 4.77, and 1.47 respectively concerning cyan, magenta, yellow, red, green, and blue. That is, in this case, the average values of color differences were 1.42 to 13.43.

In a case of the 6-fold dilute solution of the white ink, average values of color differences between white and black backings were 22.46, 27.34, 40.21, 32.67, 28.56, and 13.19 respectively concerning cyan, magenta, yellow, red, green, and blue. In a case of the 11-fold dilute solution of the white ink, average values of color differences between white and black backings were 34.80, 36.83, 52.73, 43.94, 43.05, and 22.18 respectively concerning cyan, magenta, yellow, red, green, and blue. That is, the average values of color differences between white and black backings were 13.19 to 40.21 in the case of the 6-fold dilute solution of the white ink, and 22.18 to 52.73 in the case of the 11-fold dilute solution of the white ink.

This proved that as the concentration of the white ink is lower, the average values of color differences between white and black backings increase. in other words, when the white ink is too thick, ink mixing is difficult, and when the white ink is too thin, the color is susceptible to an influence of the backing (background). It was proved that in the case of the above-described white ink (trade name: UV Ink LH-100 W, product No. SPC-0597W), it is preferable to use the solution of the white ink diluted 6 times. That is, it was proved that although the white ink is better as it is thinner, overlapping portions of the color ink and the white ink are susceptible to an influence of the background when the white ink is too thin, and that the white ink consequently needs to be thick to some degree.

Figure 4:
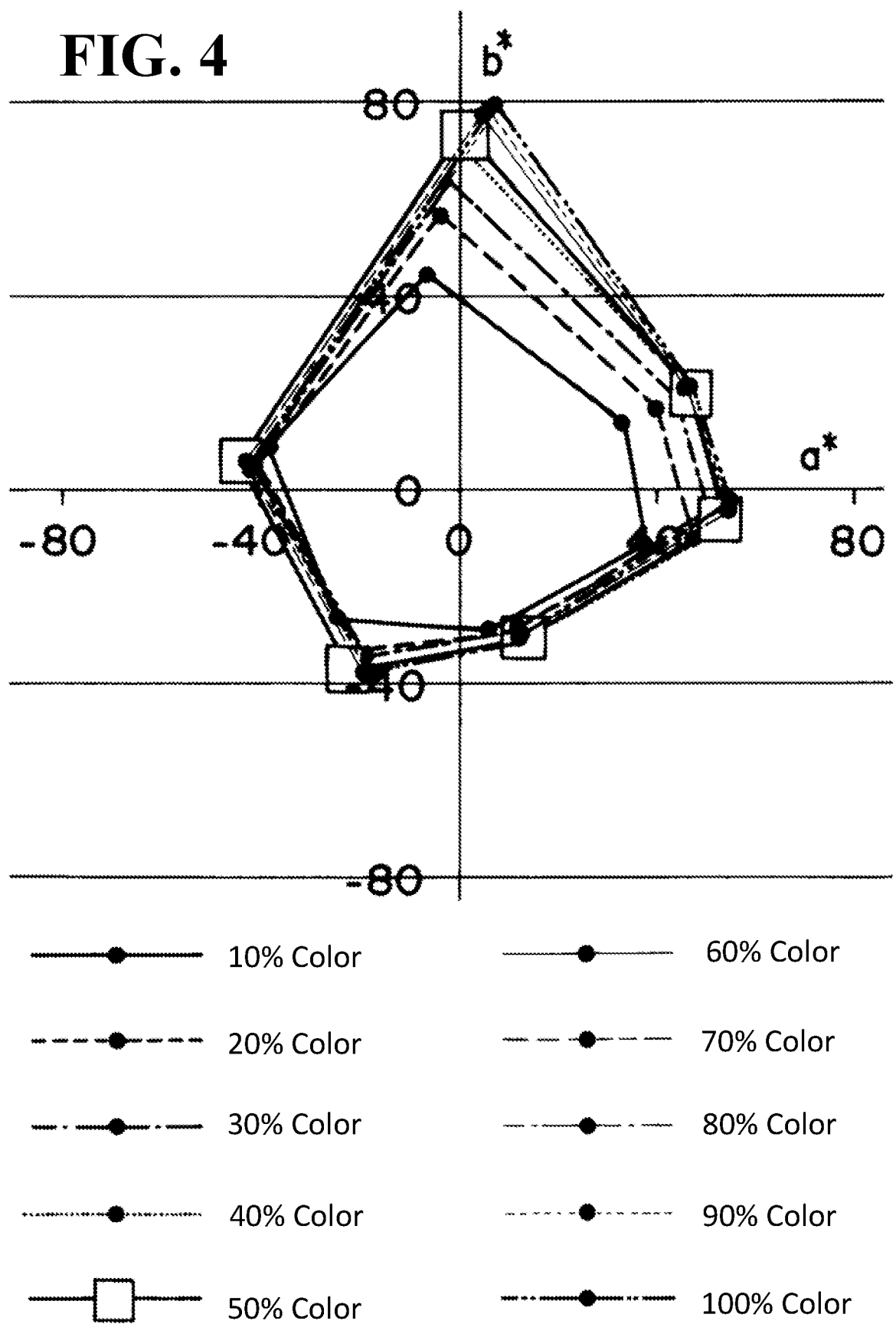
[FIG. 4]
Figure 5:
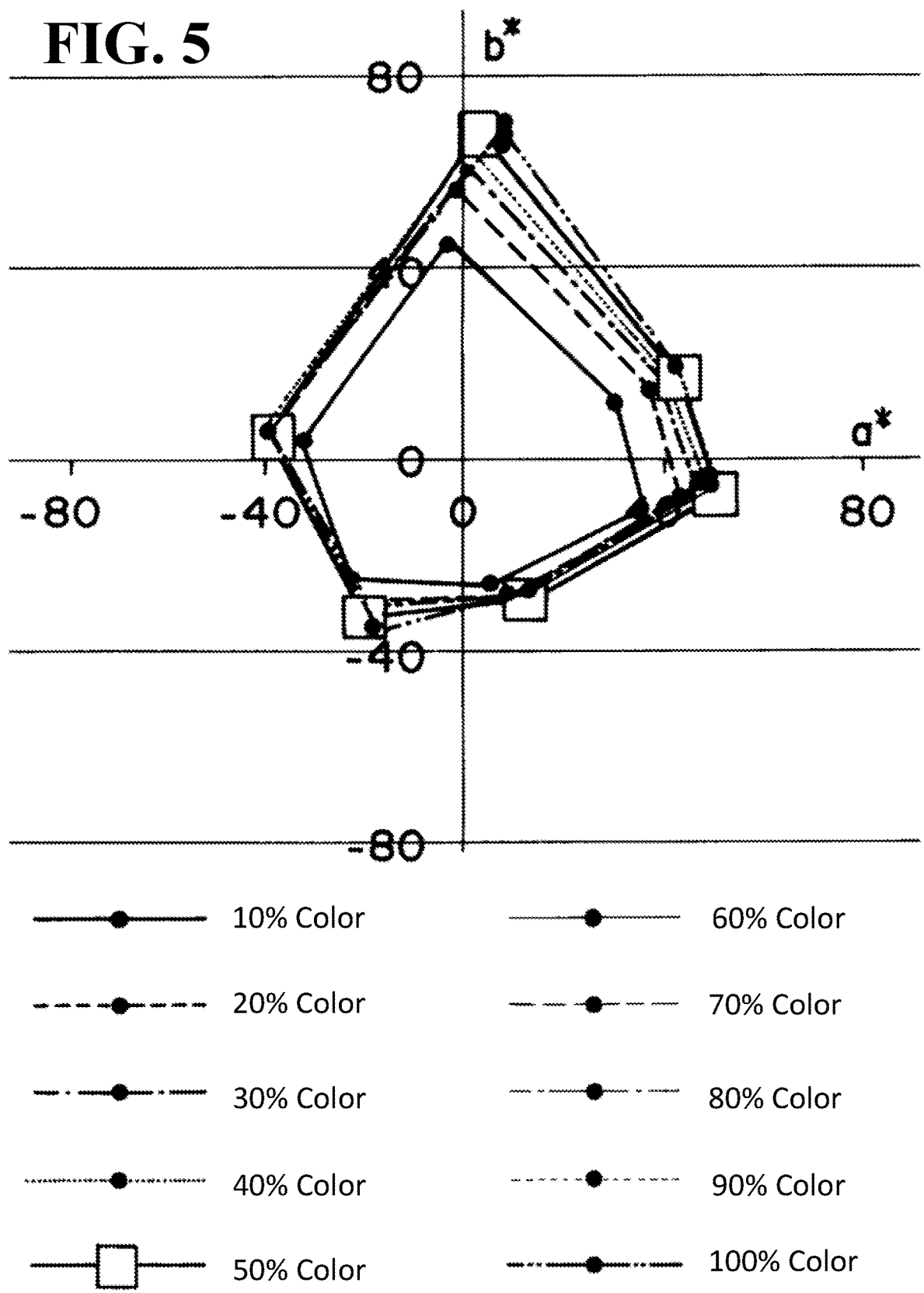
[FIG. 5]

In view of this, evaluation of color development properties was performed using the 6-fold dilute solution of the ultraviolet-curable white ink made by MIMAKI ENGINEERING CO., LTD., trade name UV Ink LH-100 W (product No. SPC-0597W). Specifically, evaluation was performed as to a hue of each mixture when the white ink had 100% ink printing density per layer and when each of the color inks had 10 to 100% ink printing density per layer. FIG. 4 illustrates color gamuts (gamuts) when 5 layers (film thickness 66 to 120 μm) were formed. FIG. 5 illustrates color gamuts (gamuts) when 15 layers (film thickness 198 to 360 μm) were formed, This result revealed that there is no significant difference between the color gamut of 5 layers and the color gamut of 15 layers, and led to a determination that 5 layers make the color complete. It was also proved that with the color development property being not affected by the film thickness, a setting as to the combination ratio makes it possible to perform color reproduction to a predetermined degree. Enlargement of the gamut was saturated with 50% color combination density.

Figure 6:
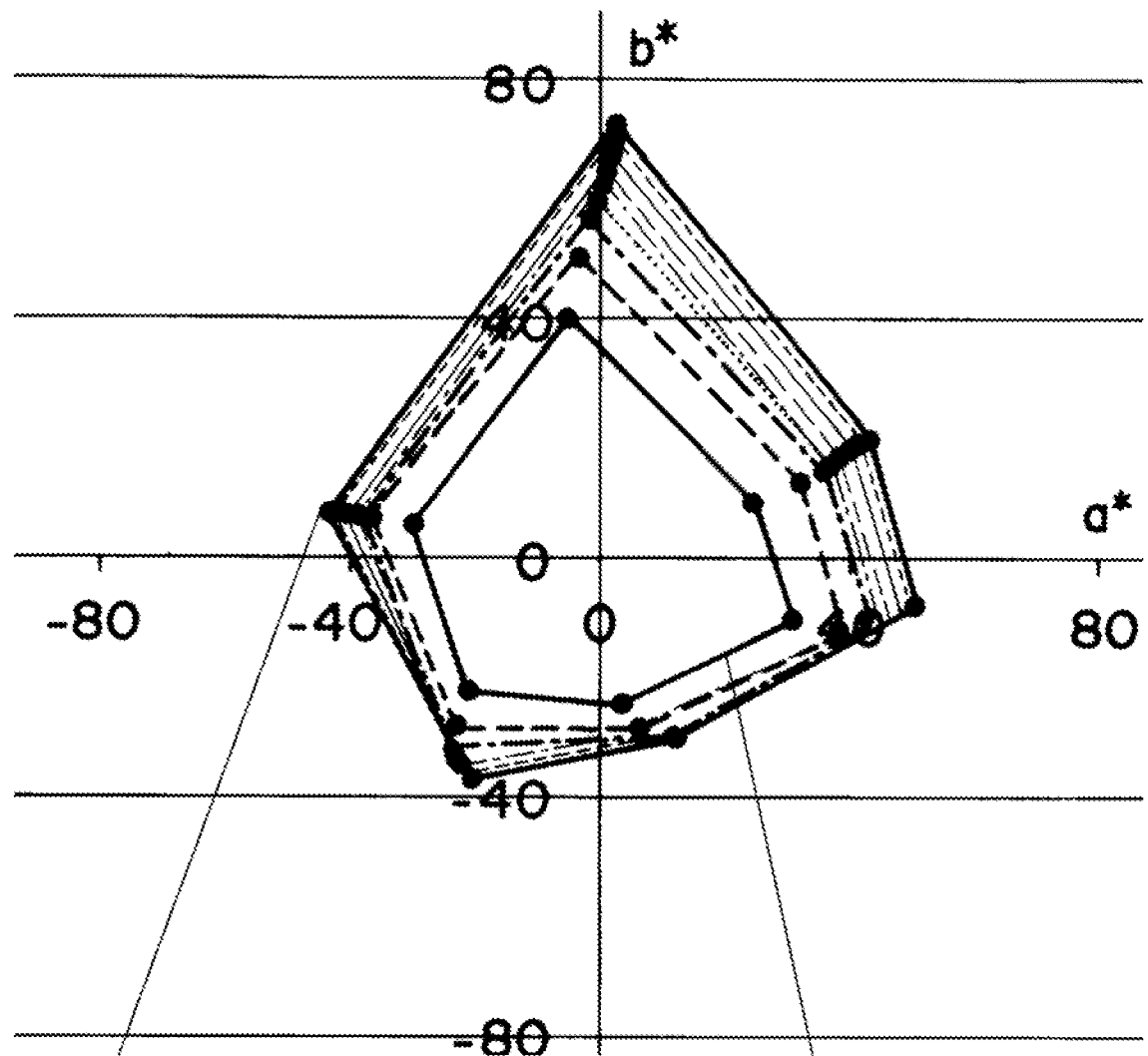
[FIG. 6]
Figure 7:
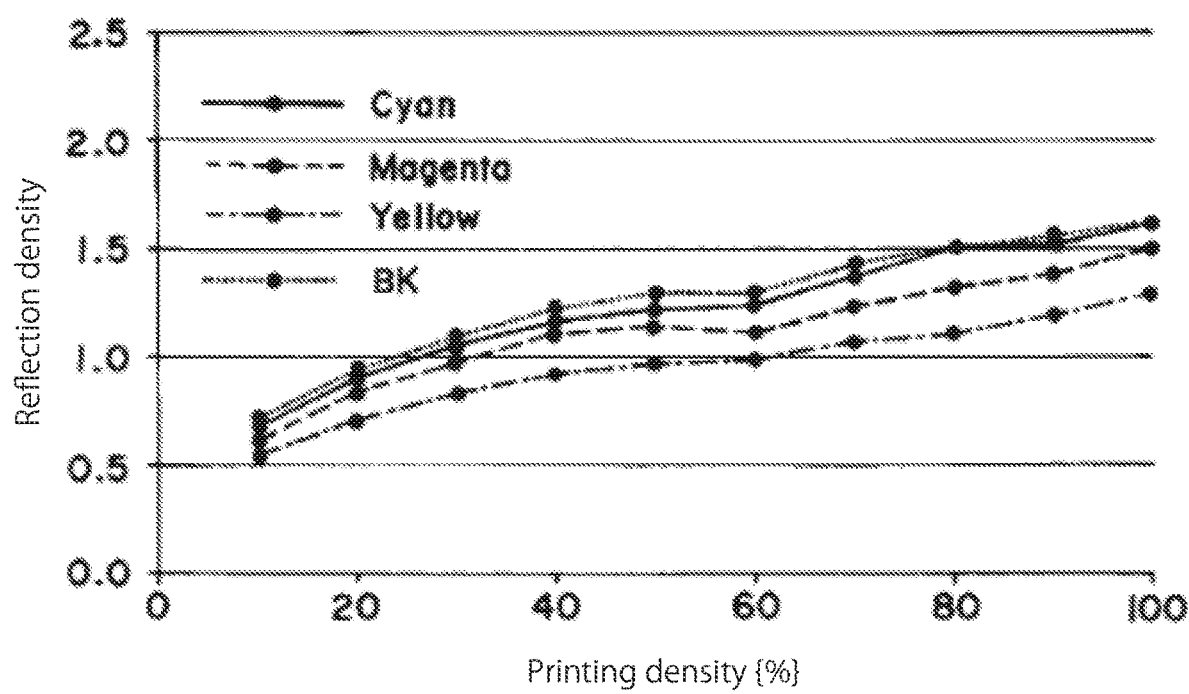
[FIG. 7]

Moreover, evaluation of gradation properties with the 6-fold dilute solution of the white ink was performed with respect to a film of 30 layers (film thickness 378 to 540 μm) formed by an ink-jet printer. The evaluation was performed as to a hue of each mixture when the white ink had 100% ink printing density per layer and when each of the color inks had 5 to 50% ink printing density per layer (in a state in which the ink limit was set at 50%). Results of the evaluation are illustrated in FIGS. 6 and 7. As illustrated in FIG. 6, the gamut showed the maximum range when 30 layers (Layer) totally had 3000% white+1500% color, each of which layers had 100% white+50% color, and the gamut showed the minimum range when 30 layers totally had 3000% white+150% color, each of which layers had 100% white+5% color. It was proved that gradation is changed between the maximum and minimum ranges. As illustrated in FIG. 7, a relationship between printing density and reflection density regarding cyan, magenta, yellow, and black (BK) is exhibited. This graph also revealed the relationship that is linear to some extent. In view of this, it is considered that it is possible to perform continuous gradation expression, and that when the combination ratios have extreme values, distinct gradation expression is possible.

Figure 8:
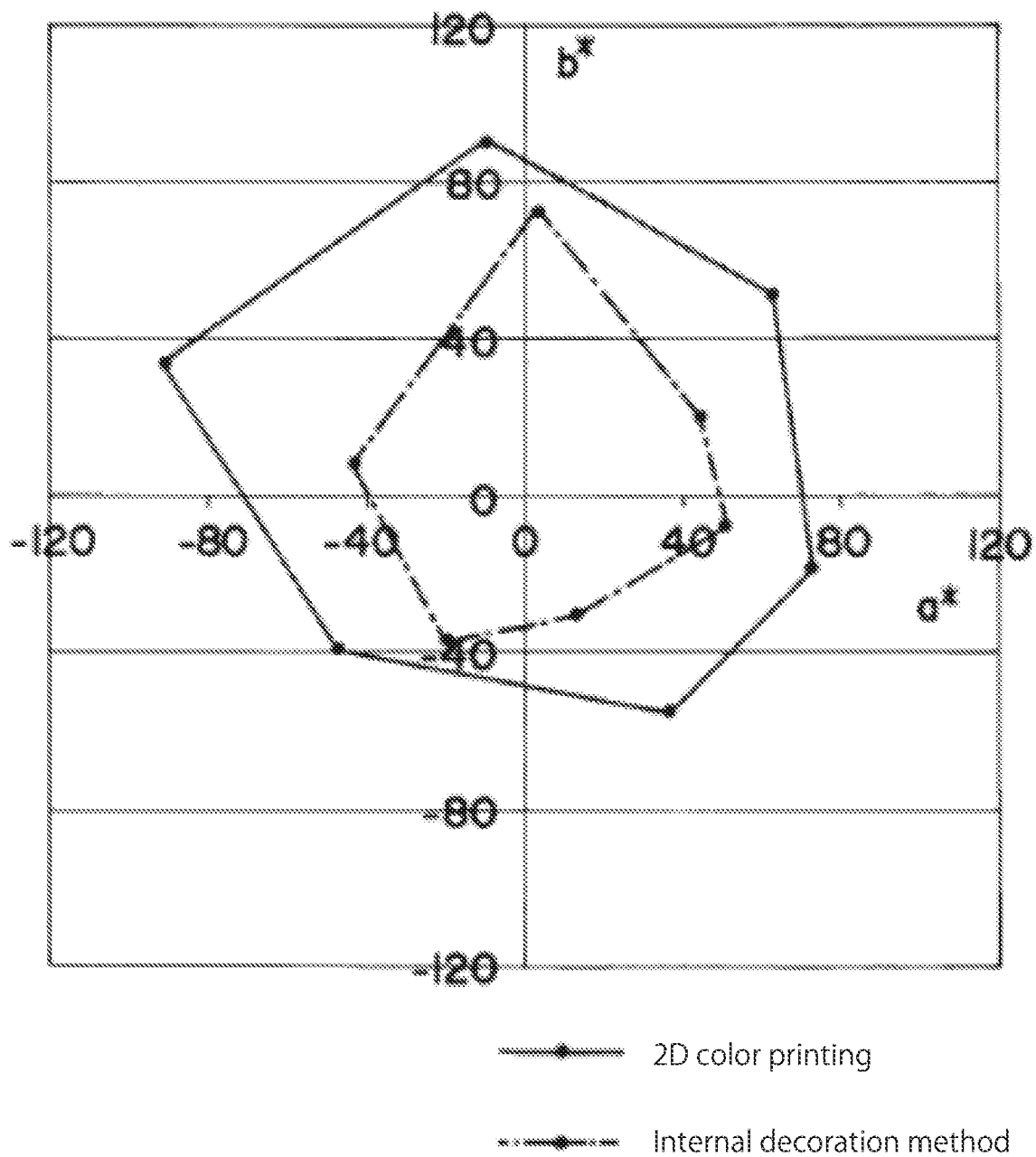
[FIG. 8]

Furthermore, in comparison of color reproducibilities between 2D color printing and the internal decoration method in this embodiment, as illustrated in FIG. 8, a potential of color reproduction in the internal decoration in this embodiment was supported. When a gamut area ratio in the 2D color printing was set at 100%, a gamut area ratio of the internal-decoration three-dimensional object 10 in this embodiment was 36.3%. This suggests that although the color gamut is not regarded to be so large, the internal decoration has a potential of the color reproducibility. With a color printing ink made by Pantone LLC, the USA, which is a color sample, being as a reference, calculation was performed to exhibit that a reproduction ratio of color reproducibility in the case of the internal decoration is 65.0% whereas a reproduction ratio of color reproducibility at the time of the 2D color printing is 93.2%.

The above-described evaluations have revealed that the internal-decoration three-dimensional object according to the present invention has the potential to ensure constant color reproduction by setting the combination ratios of the decoration materials without being affected by the film thickness, and the potential to decorate in full color not only the surface of the three-dimensional object but also the entire inside areas of the object. In other words, the internal-decoration three-dimensional object according to the present invention ensures that such internal decoration is implemented that the object looks a target color as viewed in any direction, and that the object is colored and has image depiction in any cross-section.

The invention claimed is:

1. A method for producing a three-dimensional object by extruding a build material to form a layer corresponding to each cross-section obtained by slicing a target object by a plurality of parallel planes, and depositing the layers in sequence so as to form the three-dimensional object,
    wherein a white material, one or two or more decoration materials of colors other than white and a clear material that is transparent, which solidify under a predetermined condition after extruded from nozzles, are used as the build material, and one or more dots of the decoration materials, one or more dots of the white material and one or more dots of the clear material are dispersed to form the layer,
    wherein the layers, in each of which the one or more dots of the white material, the one or more dots of the one or two or more decoration materials and the one or more dots of the clear material are dispersed, are superposed on one another to form a decoration layer comprising a plurality of the layers,
    wherein the decoration layer is formed on an outer circumferential portion of the three-dimensional object, which is a portion that affects visual recognizability results of colors that are recognized from an outside,
    wherein, in one layer of the layers, each position of the one or more dots of the one or two or more decoration materials, each position of the one or more dots of the white material and each position of the one or more dots of the clear material are different from each other,
    wherein the white material has such a concentration that when the layer is formed to have a thickness of the layer, the white material allows 10% or more of light to transmit,
    wherein, the decoration layer is formed by adjusting a combination ratio of the one or more dots of the one or two or more decoration materials and the one or more dots of the clear material according to a color shading and gradation to be expressed in the decoration layer, and
    wherein the each position of the one or more dots of the one or two or more decoration materials, the each position of the one or more dots of the white material and the each position of the one or more dots of the clear material are determined in accordance with a preset concentration resolution, based on cross-sectional data in which each position in each layer of the plurality of the layers has color information,
    wherein an outermost layer of the outer circumferential portion of the three-dimensional object is formed by jetting the clear material, instead of the white material, to all positions where the cross-sectional data indicates that the white material is to be jetted in the outermost layer.

2. The method according to claim 1, wherein the decoration materials and the clear material are dispersed to form a region surrounding a region formed of the decoration materials and the white material.

3. The method according to claim 2, wherein the build material comprises ultraviolet curable inks.

4. The method according to claim 1, wherein the build material comprises ultraviolet curable inks.

5. The method according to claim 1, wherein the decoration layer is formed based on an extrusion pattern generated by gradation conversion into binary data, and
    the method comprises moving the extrusion pattern or changing the extrusion pattern to be a different pattern such that, among the plurality of the layers that constitute the decoration layer, the positions of the dots of the decoration material in the identical color do not overlap each other at least between each adjacent pair of the layers.

6. The method according to claim 1, wherein each of the positions of the dots is a position of the dot jetted by one extruding operation.

7. The method according to claim 1,
    wherein each of the dots of the decoration materials consists of the decoration material of one color,
    wherein each of the dots of the white material consists of the white material,
    wherein each of the dots of the clear material consists of the clear material.

8. The method according to claim 7,
    wherein the white material constituting the each of the dots comprises a curable liquid that is clear and a white ink.

9. The method according to claim 7, comprising adjusting the concentration of the ink of the white material by changing a ratio of the curable liquid that is clear and the white ink.

10. The method according to claim 7, wherein the white material constituting the each of the one or more dots is a mixture of 1 part of the white ink and 5 parts of the curable liquid that is clear.

11. A method for producing a three-dimensional object, comprising:
- extruding a build material in a form of droplets onto each predetermined dot position to form a layer corresponding to each cross-section obtained by slicing a target object by a plurality of parallel planes; and
- depositing the layers in sequence so as to form the three-dimensional object,
- wherein a white material, one or two or more decoration materials of colors other than white and a clear material that is transparent, which solidify under a predetermined condition after extruded from nozzles, are used as the build material, and one or more dots of the decoration materials, one or more dots of the white material and one or more dots of the clear material are dispersed to form the layer,
- wherein the layers, in each of which the one or more dots of the white material, the one or more dots of the one or two or more decoration materials and the one or more dots of the clear material are dispersed, are superposed on one another to form a decoration layer comprising a plurality of the layers,
- wherein the decoration layer is formed on an outer circumferential portion of the three-dimensional object, which is a portion that affects visual recognizability results of colors that are recognized from an outside,
- wherein, in one layer of the layers, each position of the one or more dots of the one or two or more decoration materials, each position of the one or more dots of the white material and each position of the one or more dots of the clear material are different from each other,
- wherein the white material has such a concentration that when the layer is formed to have a thickness of the layer, the white material allows 10% or more of light to transmit,
- wherein, the decoration layer is formed by adjusting a combination ratio of the one or more dots of the one or two or more decoration materials and the one or more dots of the clear material according to a color shading and gradation to be expressed in the decoration layer, and
- wherein the each position of the one or more dots of the one or two or more decoration materials, the each position of the one or more dots of the white material and the each position of the one or more dots of the clear material are determined in accordance with a preset concentration resolution, based on cross-sectional data in which each position in each layer of the plurality of the layers has color information,
- wherein an outermost layer of the outer circumferential portion of the three-dimensional object is formed by jetting the clear material, instead of the white material, to all positions where the cross-sectional data indicates that the white material is to be jetted in the outermost layer.

* * * * *